H. G. MOSHER.
AUTOMOBILE MIRROR.
APPLICATION FILED JUNE 4, 1917.
1,275,974.
Patented Aug. 13, 1918.
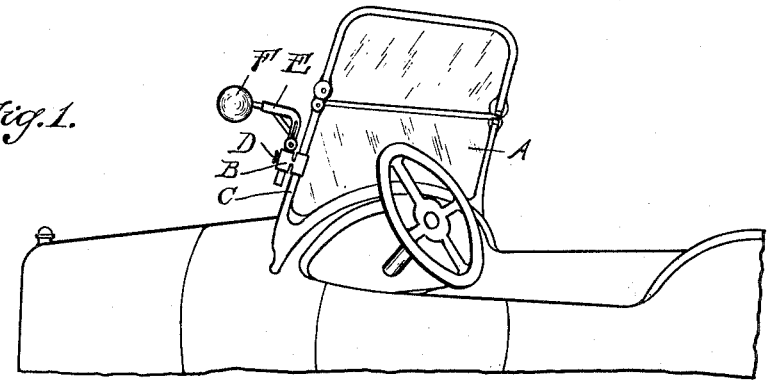
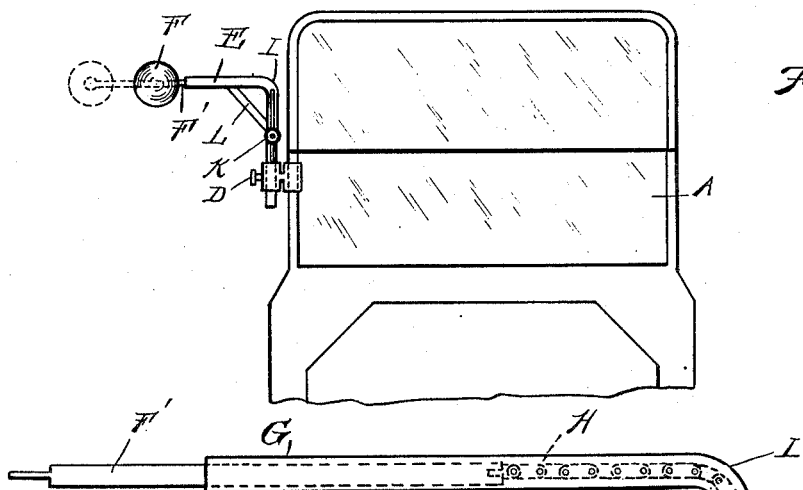
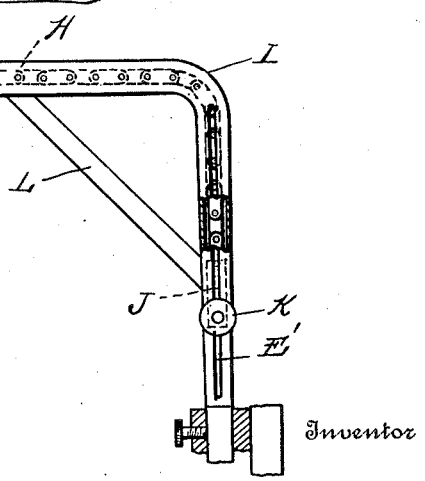
Inventor
Harvey G. Mosher
By Whittemore Hulbert & Whittemore
Attorneys

UNITED STATES PATENT OFFICE.

HARVEY G. MOSHER, OF BIRMINGHAM, MICHIGAN.

AUTOMOBILE-MIRROR.

1,275,974.  Specification of Letters Patent.  Patented Aug. 13, 1918.

Application filed June 4, 1917. Serial No. 172,641.

*To all whom it may concern:*

Be it known that I, HARVEY G. MOSHER, a citizen of the United States of America, residing at Birmingham, in the county of Oakland and State of Michigan, have invented certain new and useful Improvements in Automobile-Mirrors, of which the following is a specification, reference being had therein to the accompanying drawings.

This invention relates to automobile mirrors and refers more particularly to mirrors supported at the front of the car by means of which the driver observes the condition of traffic back of the automobile.

Among the objects of the invention are to provide in a mirror of this character a support whereby the mirror can be adjusted out to a position away from the side of the car a greater distance than normal so as to permit the driver to readily observe whether or not there is a car or other object in back of the vehicle to which the mirror is attached; to provide a construction whereby the mirror when so extended can be readily withdrawn into a position close to the side of the windshield or other member on which it is mounted; to provide a construction which can be economically manufactured and quickly adjusted to its various positions; and in general to provide a new and simplified construction and a new combination of the character above referred to.

In the drawings:

Figure 1 is a side elevational view of an automobile to which my invention is applied;

Fig. 2 is a rear elevational view of the windshield;

Fig. 3 is an enlarged detail view of one form of mirror support.

Describing in detail the particular embodiment of my invention shown in the drawings, A designates the windshield of the automobile having a bracket B secured to its side frame or standard C. Detachably mounted in the bracket B and locked in position therein by a set screw D is a supporting frame E for the mirror F. Normally these mirrors are supported relatively close to the side frame of the windshield or other part of the car on which they are supported as it is necessary that in their normal position they be located substantially within the side limits of the car. However, when so positioned the mirror will not give a good view of the road in back of the car.

The present invention therefore contemplates a construction which, while normally located substantially within the side limits of the car, can be readily adjusted to an extended position where the driver can readily observe the conditions at the back of the car. In the particular construction illustrated in the drawings, the upper part of the supporting frame E is formed hollow and at its outer end G telescopically receives a sliding bar or rod F' on which the mirror F is located. At its inner end the rod F' is connected to a link chain H which extends around the bent portion I and terminates in a vertical sliding member J having an operating button K. The stem of this button projects through a slot E' in the supporting standard so that the member J can be slid up and down. This, through the action of the connecting chain, will extend or withdraw the end of the rod F' and thus move the mirror in and out with reference to the side frame of the windshield. Normally the mirror F is retracted to its inner position as shown in full lines in Fig. 2, but whenever the driver desires to get a better view back of the car, the button K is simply slid upward and the mirror thus projected outward to the position shown in dotted lines in Fig. 2.

A suitable brace L is extended between the vertical and the horizontal portions of the mirror support, but the invention is not limited to the particular construction shown. Thus in place of the link chain H there could be substituted a heavy flexible wire member, and various other devices employed for projecting and withdrawing the mirror with reference to the windshield or other support, within the scope of my invention.

What I claim as my invention is:—

In an automobile mirror, the combination with the windshield frame or like support, of a bracket member connected to said support, a mirror supporting rod slidably mounted in said bracket, a mirror mounted on the end of said rod, an adjusting member movably mounted in said bracket and a connection between said last-mentioned member and the rod whereby the sliding movement of said adjusting member can be utilized for quickly adjusting the mirror away from or toward the supporting frame.

In testimony whereof I affix my signature.

HARVEY G. MOSHER.